United States Patent
Lee et al.

(10) Patent No.: US 10,105,772 B2
(45) Date of Patent: Oct. 23, 2018

(54) INSERT, TOOL HOLDER, AND ASSEMBLY THEREOF

(71) Applicant: KORLOY INC., Seoul (KR)

(72) Inventors: Sang-Yong Lee, Cheongju-si (KR); Nam-Sun Lee, Chengju-si (KR); Ki-Chan Nam, Cheongju-si (KR); Kane-Hee Lee, Cheongju-si (KR); Sun-Yong Ahn, Cheongju-si (KR)

(73) Assignee: KORLOY INC., Seoul (KR)

( * ) Notice: Subject to any disclaimer, the term of this patent is extended or adjusted under 35 U.S.C. 154(b) by 250 days.

(21) Appl. No.: 15/031,388

(22) PCT Filed: Nov. 7, 2014

(86) PCT No.: PCT/KR2014/010673
§ 371 (c)(1),
(2) Date: Apr. 22, 2016

(87) PCT Pub. No.: WO2015/099286
PCT Pub. Date: Jul. 2, 2015

(65) Prior Publication Data
US 2016/0288225 A1    Oct. 6, 2016

(30) Foreign Application Priority Data
Dec. 24, 2013    (KR) ........................ 10-2013-0162569

(51) Int. Cl.
*B23Q 11/00*    (2006.01)
*B23C 5/22*    (2006.01)
*B23C 5/10*    (2006.01)

(52) U.S. Cl.
CPC ............ *B23C 5/2221* (2013.01); *B23C 5/109* (2013.01); *B23C 2200/0494* (2013.01);
(Continued)

(58) Field of Classification Search
CPC ........ B23C 2200/362; B23C 2200/165; B23C 2200/16; B23C 2200/161; B23C 2200/361; B23C 2210/16; B23C 2210/168
See application file for complete search history.

(56) References Cited

U.S. PATENT DOCUMENTS 5,893,683 A    4/1999   Johnson
8,388,272 B2 *  3/2013   De Souza Filho ... B23C 5/2221
                                              407/103
(Continued)

FOREIGN PATENT DOCUMENTS

JP    2009-534199 A    9/2009
JP    2011-110664 A    6/2011
(Continued)

*Primary Examiner* — Will Fridie, Jr.
(74) *Attorney, Agent, or Firm* — Rabin & Berdo, P.C.

(57) ABSTRACT

A technical object is to provide an insert capable of preventing escaping of the insert from an assembly of the insert and a tool holder. To this purpose, the insert includes an insert body, and a holder fastening portion provided in the insert body to be fastened to the tool holder, in which the holder fastening portion includes one or more fastening holes formed through the insert body from an upper surface to a lower surface, and one or more locking recesses formed by being recessed in a lower surface periphery of the insert body.

10 Claims, 9 Drawing Sheets

(52) U.S. Cl.
CPC .. *B23C 2200/165* (2013.01); *B23C 2200/362* (2013.01); *B23C 2210/168* (2013.01)

(56) References Cited

U.S. PATENT DOCUMENTS

| | | | | |
|---|---|---|---|---|
| 2007/0177951 | A1* | 8/2007 | Sakamoto | B23C 5/109 407/40 |
| 2007/0248425 | A1* | 10/2007 | Andersson | B23C 5/06 407/113 |
| 2008/0044239 | A1* | 2/2008 | Sjoo | B23C 5/2406 407/36 |
| 2008/0166191 | A1* | 7/2008 | Andersson | B23C 5/2208 407/103 |
| 2010/0008735 | A1* | 1/2010 | Dudzinsky | B23C 5/109 407/48 |
| 2011/0293381 | A1* | 12/2011 | Saji | B23C 5/109 407/40 |
| 2012/0201622 | A1* | 8/2012 | Kocherovsky | B23B 29/02 409/131 |
| 2013/0251463 | A1* | 9/2013 | Harif | B23B 27/04 407/11 |
| 2015/0336187 | A1* | 11/2015 | Choi | B23C 5/06 407/48 |

FOREIGN PATENT DOCUMENTS

| | | | |
|---|---|---|---|
| KR | 10-1270186 | B1 | 6/2013 |
| KR | 10-1291024 | B1 | 7/2013 |
| KR | 10-1318583 | B1 | 10/2013 |

* cited by examiner

INSERT, TOOL HOLDER, AND ASSEMBLY THEREOF

TECHNICAL FIELD

The present disclosure relates to an insert used for cutting or groove machining, a tool holder for receiving the same, and an assembly in which the insert and the tool holder are coupled with each other.

BACKGROUND ART

Generally, an insert is fastened to a cutting tool mounted on a machine tool, to be used for cutting a workpiece composed of ferrous, nonferrous metals, nonmetal materials, and so on.

Such insert generally includes a body, a cutting portion provided on an upper surface edge of the body to directly cut the workpiece, and a fastening portion provided on the body to be fastened to a holder of the cutting tool. Specifically, the cutting portion includes first and second major cutting edges respectively formed on two long edges of the rectangle-shaped upper surface of the body, and first and second minor cutting edges respectively formed on two short edges. The fastening portion includes first and second fastening holes extending through the body from the upper surface to a lower surface. Further, to enable turning by 180 degrees and re-use thereof, the first and second major cutting edge, the first and second minor cutting edges, and the first and second fastening holes respectively have symmetric shapes by 180 degrees with reference to a center of the upper surface.

Meanwhile, the tool holder generally includes two or more chip pockets having a pocket-shaped flute to discharge chips, a sheet portion provided at each of the chip pockets to fasten the insert, and a web forming a boundary between the first and second pockets.

One of related insert routers is disclosed in U.S. Pat. No. 5,893,683, which has a structure such that, as illustrated in FIGS. 9B and 9C, a lower surface 41 of the insert 28 has a flat shape, and as illustrated in FIG. 8, a lower surface sheet portion 26 of the tool holder fastened with the lower surface 41 of the insert 28 has a correspondingly flat shape. Further, as illustrated in FIGS. 9B and 9C, a major edge clearance surface 45 that forms a major side surface of the insert 28 is inclined with respect to the upper surface 32 and the lower surface 41, while forming a flat plane. Further, as illustrated in FIGS. 8 and 9A, 9B and 9C, a blind groove 44 to enhance fastening torque with the tool holder is formed between the first and second fastening holes 42, in which the blind groove 44 has a closed shape such that the blind groove 44 is not extended through to the upper surface 32, but formed in a portion of the lower surface 41.

However, the related technology described above has a problem of deteriorated fastening torque among parts, allowing the insert 28 to be escaped out of the tool holder, because the lower surface 41 of the insert 28 where the insert 28 and the tool holder are in contact, and the lower surface of the tool holder each have the flat shapes.

Further, since the major edge clearance surface 45 of the insert 28 forms a flat plane, it does not have a part that can serve as a locking portion such that the insert is escaped from the tool holder when subject to centrifugal force or centripetal force during cutting process, which is problematic.

Further, in order to coat the insert 28, two pins (not illustrated) are inserted into the first and second fastening holes (see 42), respectively, after which the insert 28 is loaded into a coating furnace (not illustrated) for coating thereof. During this process, as one insert 28 occupies two pins, the charge decreases considerably.

DISCLOSURE OF INVENTION

Technical Problem

A technical object of the present disclosure is to provide an insert, a tool holder, and an assembly thereof, which can prevent escaping of the insert from the tool holder.

Another technical object of the present disclosure is to provide an insert having a structure such that a charge increases during insert coating.

Solution to Problem

To achieve the above purpose, an insert according to an exemplary embodiment includes an insert body, and a holder fastening portion provided in the insert body to be fastened to the tool holder, in which the holder fastening portion includes one or more fastening holes formed by being passed through the insert body from an upper surface to a lower surface, and one or more locking recesses formed by being recessed in a lower surface periphery of the insert body.

The lower surface periphery may include first, second, third, and fourth lower surface edge portions sequentially along a circumference thereof, the one or more locking recesses may include first and second locking recesses, and the first and second locking recesses may each be formed by being recessed in the first and third lower surface edge portions.

The first locking recess may have an inclined shape such that it is recessed to a gradually increasing depth along a direction from the second lower surface edge portion to the fourth lower surface edge portion, and the second locking recess may have an inclined shape such that it is recessed to a gradually increasing depth along a direction from the fourth lower surface edge portion to the second lower surface edge portion.

The first and second locking recesses may have a symmetrical shape with each other by 180 degrees with reference to a center of the lower surface.

Formed sequentially on an upper surface of the insert body along a circumference thereof may be a first major cutting edge, a first minor cutting edge, a first inclined cutting edge, a second major cutting edge, a second minor cutting edge, and a second inclined cutting edge. A side surface of the insert body may include, sequentially along a circumference thereof, a first major side surface connected to the first major cutting edge, a first minor side surface connected to the first minor cutting edge, a first inclined side surface connected to the first inclined cutting edge, a second major side surface connected to the second major cutting edge, a second minor side surface connected to the second minor cutting edge, and a second inclined side surface connected to the second inclined cutting edge. The first locking recess may be exposed to one of the first and second inclined side surfaces, and the second locking recess may be exposed to the other of the first and second inclined side surfaces.

When a height of the insert body is "H", a depth of each of the first and second locking recesses is "h", and a tilt angle of the first and second locking recesses is "α", 0.5H>h, and 0<α<5°.

The first major side surface may form a major edge clearance surface, and the major edge clearance surface may include a first clearance surface in contact with the first major cutting edge, a second clearance surface extending from the first clearance surface and having a greater clearance angle than the first clearance surface, a third clearance surface extending from a clearance surface adjacent to a side of the first minor side surface in the second clearance surface, being curved convexly toward the lower surface, and having a greater clearance angle than the second clearance surface, a fourth clearance surface having a portion extending from the second clearance surface, and a rest portion extending from the third clearance surface, and being curved convexly toward the first major cutting edge, and a fifth clearance surface extending from a clearance surface adjacent to a side of the second inclined side surface in the fourth clearance surface, being inclined toward a center of the lower surface, and having a clearance angle same as the second clearance surface.

A center hole may be additionally formed in a center of an upper surface of the insert body, passing through the insert body from the upper surface to a lower surface thereof.

The one or more fastening holes may include first and second fastening holes formed sequentially in the insert body, and the center hole may be formed at a center between the first and second fastening holes.

Meanwhile, a tool holder according to an exemplary embodiment may include a holder body having a lower surface sheet portion, a major side surface sheet portion, and an inclined side surface sheet portion, and an insert fastening portion provided in the holder body to fasten the holder fastening portion of an insert. The insert fastening portion may include one or more screw holes formed at a center portion of the lower surface sheet portion, and one or more locking protrusions protruding from a periphery of the lower surface sheet portion.

The one or more locking protrusions may include first and second locking protrusions, the periphery of the lower surface sheet portion may include first, second, third, and fourth sheet edge portions sequentially along a circumference thereof, and the first and second locking protrusions may each be protruded from the first and third sheet edge portions.

The first locking protrusion may be in contact with an outer circumference of the tool holder, and may have an inclined shape such that the first locking protrusion protrudes to a gradually increasing height along a direction toward the inclined side surface sheet portion. The second locking protrusion may be in contact with the major side surface sheet portion, and may have an inclined shape such that the second locking protrusion protrudes to a gradually increasing height along a direction toward a leading end of the tool holder.

The one or more screw holes may include first and second screw holes formed sequentially at a center portion of the lower surface sheet portion.

Meanwhile, an assembly of an insert and a tool holder in which the insert and the tool holder are assembled with each other, may include the insert having a holder fastening portion in an insert body to be fastened to the tool holder, and the holder body having an insert fastening portion in the holder body to fasten the holder fastening portion of the insert. The holder fastening portion may include one or more fastening holes formed through a center portion of the insert body from an upper surface to a lower surface, and one or more locking recesses formed by being recessed into a lower surface periphery of the insert body, and the insert fastening portion may include a screw hole corresponding to each of the one or more fastening holes, and a locking protrusion for locking in each of the one or more locking recesses.

Advantageous Effects of Invention

As described above, the insert, the tool holder, and the assembly thereof according to an exemplary embodiment can provide the following effects.

According to exemplary embodiments, because one or more locking recesses are formed in a lower surface of the insert body, escaping of the insert from the tool holder can be prevented. Specifically, when the first and second locking recesses are formed in the first and third lower surface edge portions of the lower surface of the insert body, the first and second locking recesses have an inclined shape such that it is recessed to a gradually increasing depth along a direction toward the second or the fourth lower surface edge portion. Accordingly, since the helix angle can be configured as large as the tilt angle of the inclination, the process load during high depth process can be reduced. Furthermore, since the inclined shape of the first and second locking recesses allows a fastening area to be increased as the cutting depth increases in the lengthwise direction, the fastening torque can be maintained stably with respect to the process load during high depth process. Further, since the first and second locking protrusions are formed in the holder body of the tool holder to be locked in the first and second locking recesses in the inclined shape, build-up is formed on the lower surface sheet portion of the holder body, and this prevents escaping of the insert by the centrifugal force generated during high-speed process.

Further, according to an exemplary embodiment, because a center hole is additionally formed in a center of the upper surface of the insert body, by being passed through the insert body from the upper surface to the lower surface, one pin can be inserted in one center hole for coating during a coating process to coat the insert. Accordingly, compared to the related example in which the pins are inserted into the respective first and second fastening holes, lot deviation of the thin films occurring during mass production can be minimized, and the charge per coating can be increased.

Further, according to an exemplary embodiment, since the major edge clearance surface of the insert includes first, second, third, fourth, and fifth clearance surfaces each having a corresponding clearance angle, and thus has an uneven, stepped shape, escaping of the insert due to centrifugal force or centripetal force can be prevented.

BRIEF DESCRIPTION OF DRAWINGS

FIG. 9 illustrates the insert of the insert router of FIG. 8, in which FIG. 9A is a plan view of the upper surface of the insert, FIG. 9B is a side view of a long major side surface of the insert, FIG. 9C is a bottom view of the lower surface of the insert, and FIG. 9D is a view of a short minor side surface of the insert.

MODE FOR THE INVENTION

Hereinbelow, exemplary embodiments of the present disclosure will be described in detail with reference to the accompanying drawings to enable those skilled in the art to easily work the present disclosure. However, the present disclosure can be implemented in several different forms, and not to be limited to certain embodiments described herein.

Figure 1:
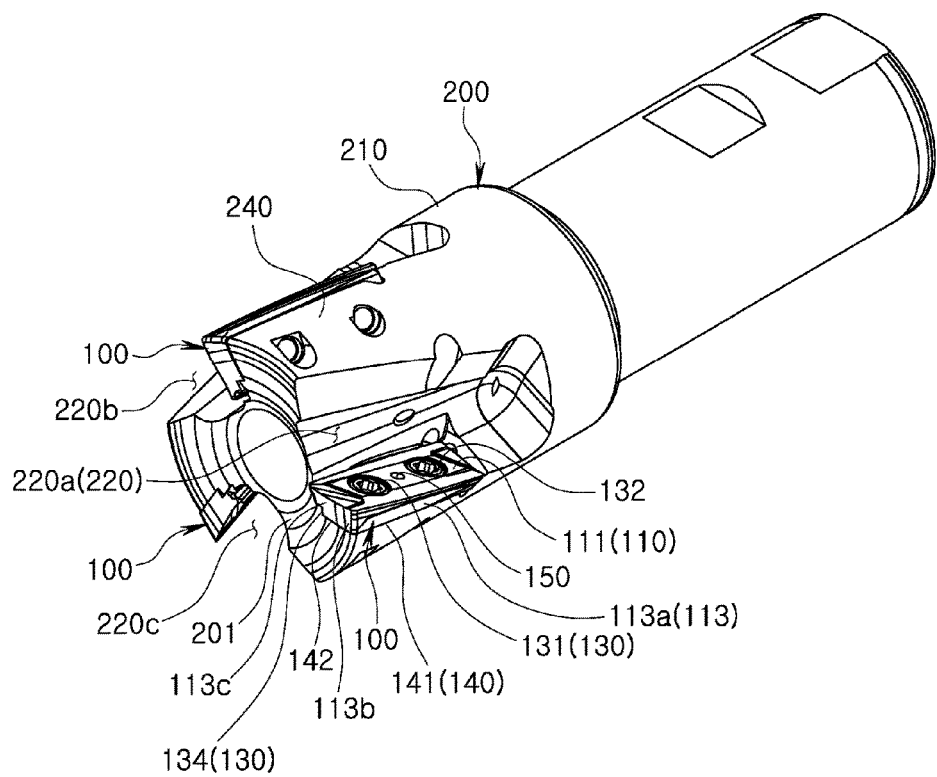
FIG. 1 is a perspective view of an insert-tool holder assembly according to an exemplary embodiment.
Figure 2:
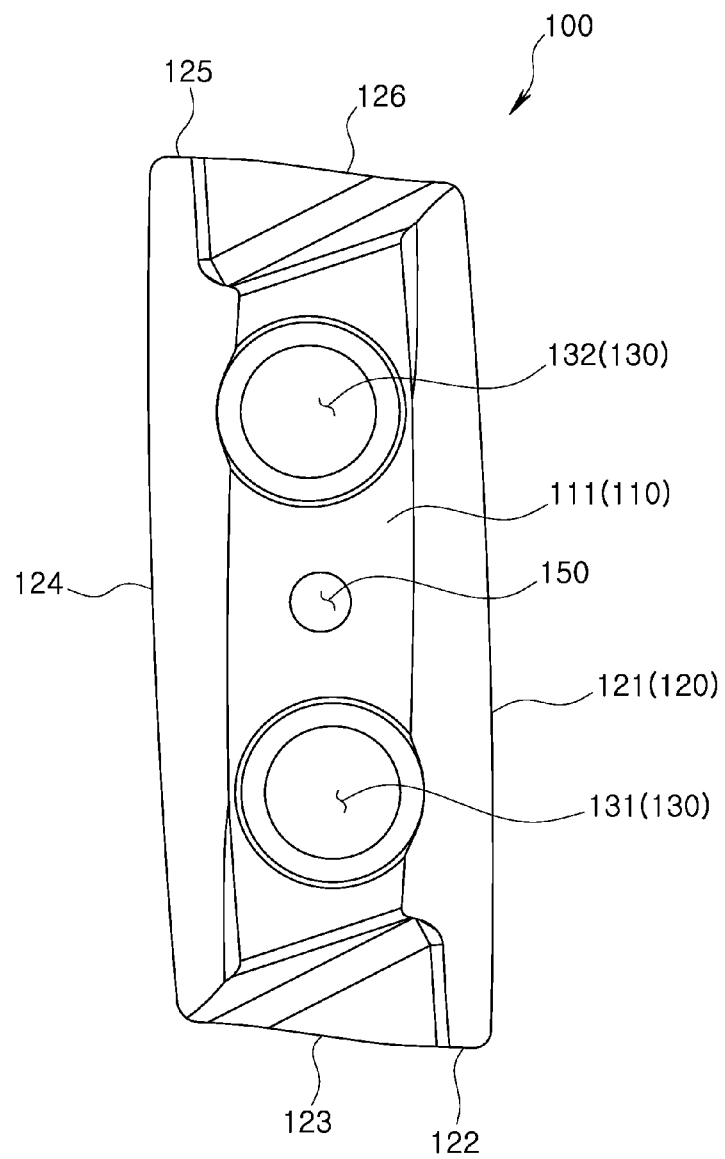
FIG. 2 is a plan view of the insert-tool holder assembly of FIG. 1, illustrating an upper surface of the insert.
Figure 3:
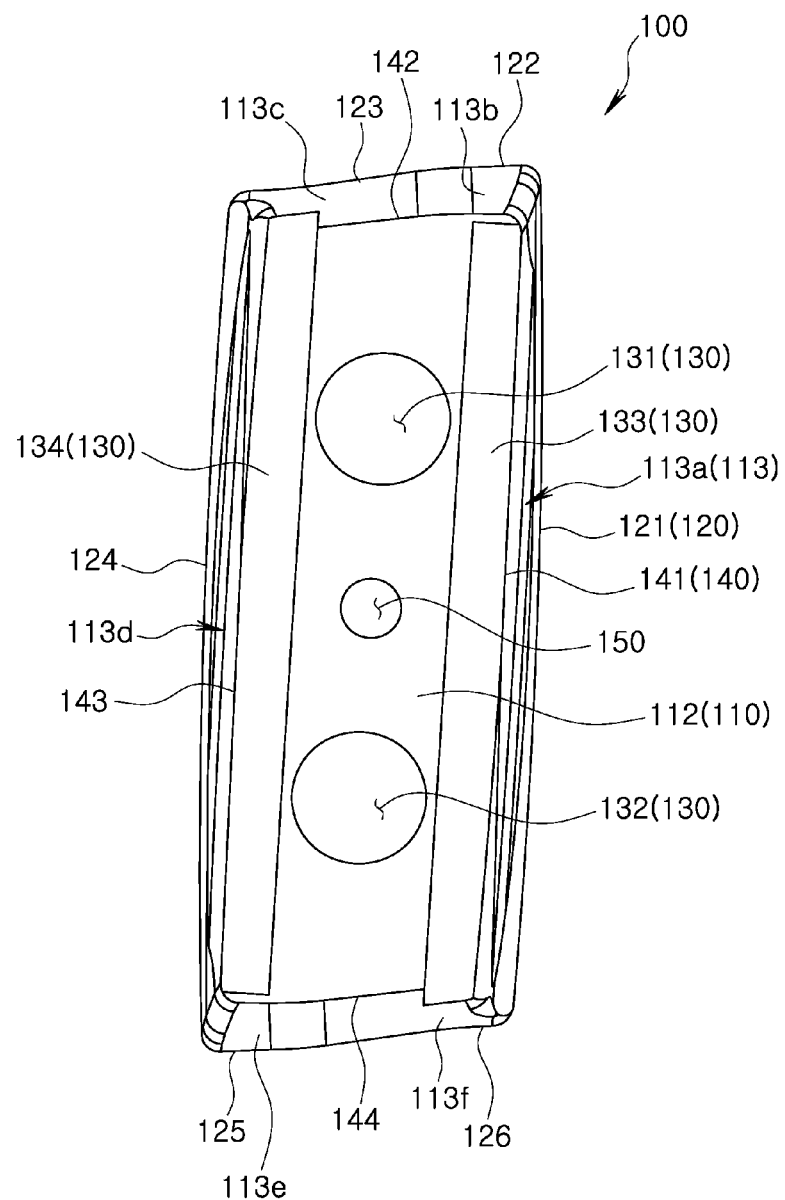
FIG. 3 is a bottom view showing a lower surface of the insert of FIG. 2.

FIG. 1 is a perspective view of an insert-tool holder assembly according to an exemplary embodiment, FIG. 2 is a plan view of the insert-tool holder assembly of FIG. 1, illustrating an upper surface of the insert, and FIG. 3 is a bottom view showing a lower surface of the insert of FIG. 2.

Figure 4:
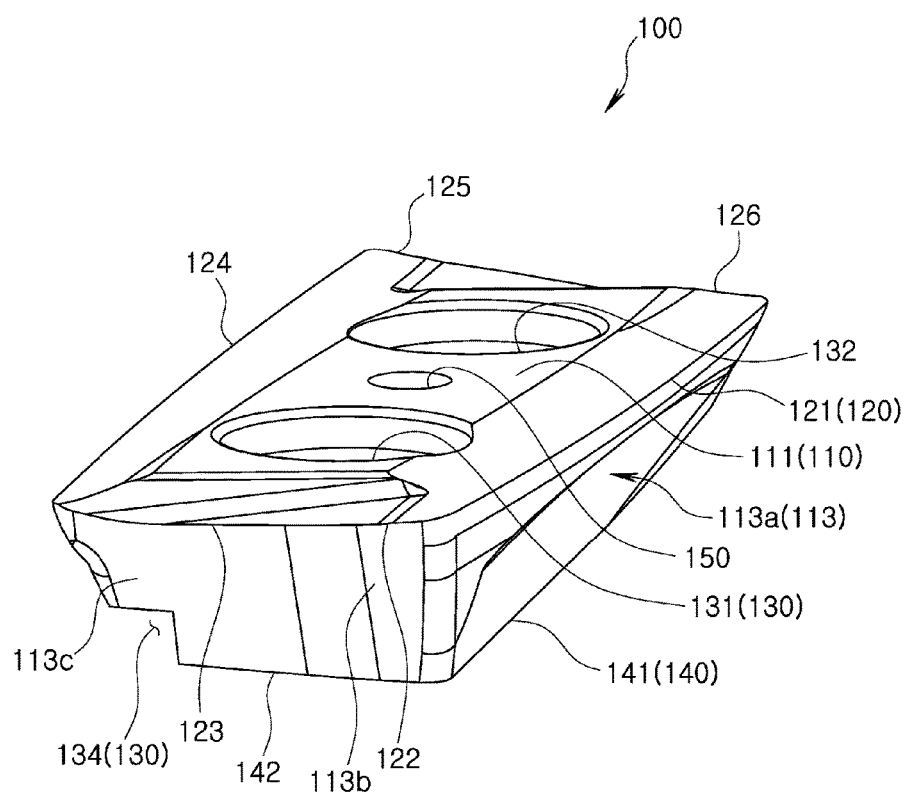
FIG. 4 is a plan perspective view showing the insert of FIG. 2 from above.
Figure 5:
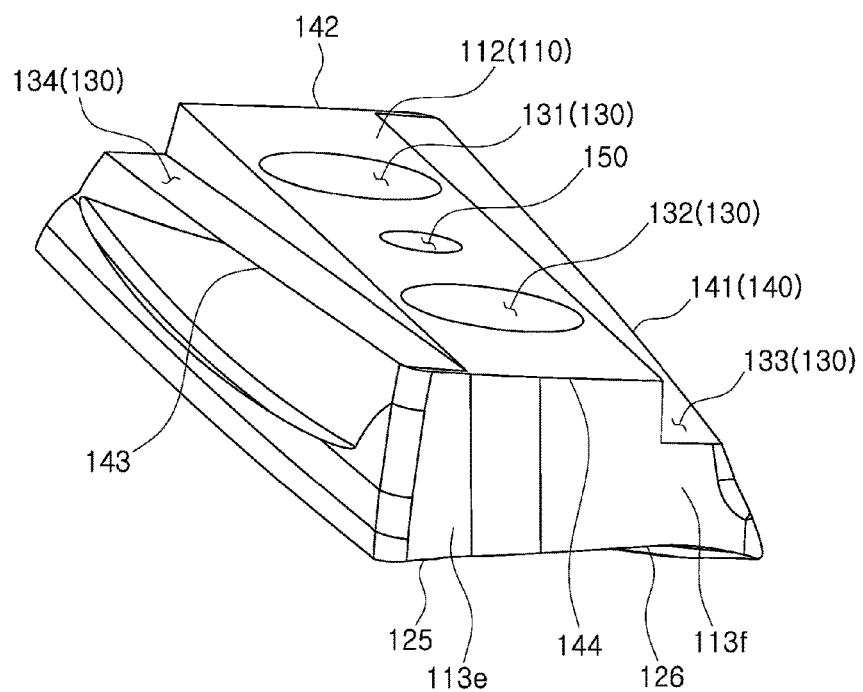
FIG. 5 is a bottom perspective view showing the insert of FIG. 2 from below.

FIG. 4 is a plan perspective view showing the insert of FIG. 2 seen from above, and FIG. 5 is a bottom perspective view showing the insert of FIG. 2 seen from below.

According to an exemplary embodiment, the insert 100 includes an insert body 110, a cutting portion 120, a lower surface periphery 140, and a holder fastening portion 130, as illustrated in FIGS. 1 to 5.

The insert body 110 forms the body of the insert 100, and as illustrated in FIGS. 1, 4 and 5, it roughly takes a form of a hexahedron including an upper surface 111, a lower surface 12, and a side surface 113. For example, the side surface 113 may be divided into a long major side surface 113a, a short minor side surface 113b, and a short inclined side surface 113c between the major side surface 113a and the minor side surface 113b.

The cutting portion 120 is the portion that directly cuts the workpiece, and as illustrated in FIGS. 2 and 3, includes a first major cutting edge 121, a first minor cutting edge 122, a first inclined cutting edge 123, a second major cutting edge 124, a second minor cutting edge 125, and a second inclined cutting edge 126, which are formed on the upper surface 111 of the insert body 110, sequentially along a circumference in a clockwise direction (or counterclockwise direction in FIG. 3 which is the bottom view of FIG. 2). Specifically, as illustrated in FIG. 3, when the side surface 113 of the insert body 110 includes, in a counterclockwise direction along a circumference thereof, a first major side surface 113a, a first minor side surface 113b, a first inclined side surface 113c, a second major side surface 113d, a second minor side surface 113e, and a second inclined side surface 113f, the first major cutting edge 121 may be connected to the first major side surface 113a, the first minor cutting edge 122 may be connected to the first minor side surface 113b, the first inclined cutting edge 123 may be connected to the first inclined side surface 113c, the second major cutting edge 124 may be connected to the second major side surface 113d, the second minor cutting edge 125 may be connected to the second minor side surface 113e, and the second inclined cutting edge 126 may be connected to the second inclined side surface 113f. Moreover, referring back to FIG. 2, the first major cutting edge 121, the first minor cutting edge 122, and the first inclined cutting edge 123 may each have a symmetric shape by 180 degrees with the second major cutting edge 124, the second minor cutting edge 125, and the second inclined cutting edge 126, with reference to the center of the upper surface 111. Further, referring back to FIG. 3, the first side surface 113a, the first minor side surface 113b, and the first inclined side surface 113c may each have a symmetric shape by 180 degrees with the second major side surface 113d, the second minor side surface 113e, and the second inclined side surface 113f, with reference to the center of the lower surface 112. In such symmetric shape, when wears or breakages occur, the first major cutting edge 121, the first minor cutting edge 122 and the first inclined cutting edge 123 may be rotated by 180 degrees such that the second major cutting edge 124, the second minor cutting edge 125 and the second inclined cutting edge 126 may be used.

The lower surface periphery 140 is the portion that forms the edge, and as illustrated in FIGS. 3 and 5, includes first, second, third and fourth lower surface edge portions 141, 142, 143, 144 on the lower surface of the insert body 110 along the circumference thereof in a counterclockwise direction. For example, although not illustrated, the first, second, third and fourth lower surface edge portions 141, 142, 143, 144 may have the same length as one another, or as illustrated in FIGS. 3 and 5, the first and third lower surface edge portions 141, 143 opposed to each other may be relatively longer, while the rest, i.e., the second and fourth lower surface edge portions 142, 144 may be relatively shorter.

Hereinbelow, one exemplary embodiment will be described with reference to an example in which the first and third lower surface edge portions 141, 143 opposed to each other may be relatively longer, while the rest, i.e., the second and fourth lower surface edge portions 142, 144 may be relatively shorter. Reflecting the above, the description below will refer to the first and third lower surface edge portions 141, 143 respectively as the "first and second long direction lower surface edge portions" (hereinbelow, referred to by a reference numeral "141"), and refer to the second and fourth lower surface edge portions 142, 144 respectively as the "first and second short direction lower surface edge portions" (hereinbelow, referred to by a reference numeral "144"). Furthermore, referring back to FIG. 3, the first long direction lower surface edge portion 141 and the first short direction lower surface edge portion 142 may have a symmetric shape by 180 degrees with the second long direction lower surface edge portion 143 and the second short direction lower surface edge portion 144 with reference to the center of the lower surface 112.

As illustrated in FIGS. 2 to 5, the holder fastening portion 130 is provided at the insert body 110 to be fastened to the tool holder 200, and includes one or more fastening holes (see 131, 132), and one or more locking recesses (see 133, 134).

As illustrated in FIGS. 2 and 4, the one or more fastening holes (see 131, 132) may be formed by being passed through the insert body 110 from the upper surface 111 to the lower surface 112. More specifically, the one or more fastening holes may include first and second fastening holes 131, 132 sequentially formed in a long direction.

As illustrated in FIGS. 3 and 5, the one or more locking recesses (see 133, 134) may include first and second locking recesses 133, 134, and as illustrated in FIGS. 3 and 5, the first and second locking recesses 133, 134 may be formed by being recessed in the lower surface 112 of the insert body 110. For example, as illustrated in FIGS. 3 and 5, the first and second locking recesses 133, 134 may be formed by being respectively recessed in the first and second long direction lower surface edge portions 141, 143 of the lower surface 112 of the insert body 110, or may be formed by being respectively recessed in the first and second short direction lower surface edge portions 142, 144 of the lower surface 112 of the insert body 110, although not illustrated. Accordingly, the first and second locking recesses 133, 134 of the insert 100 can prevent escaping of the insert 100 from the tool holder 200.

Specifically, as illustrated in FIGS. 3 and 5, the first locking recess 133 may have an inclined shape such that the first locking recess 133 is recessed to a gradually increasing depth along a direction from the first short direction lower surface edge portion 142 to the second short direction lower surface edge portion 144, and the second locking recess 134 may have an inclined shape such that the second locking recess 134 is recessed to a gradually increasing depth along a direction from the second short direction lower surface edge portion 144 to the first short direction lower surface edge portion 142. Accordingly, since the helix angle can be configured as large as the tilt angle α of the inclination, process load can be reduced during high depth process. Furthermore, since the inclined shape of the first and second locking recesses 133, 134 described above allows a fastening area to be correspondingly increased as the cutting depth increases in the lengthwise direction, the fastening torque can be maintained stably with respect to the process load during high depth process. Meanwhile, although not illustrated, another example may be contemplated, in which the first locking recess 133 may have an inclined shape such that the first locking recess 133 is recessed to a gradually increasing depth along a direction from the second short direction lower surface edge portion 144 to the first short direction lower surface edge portion 142, and the second locking recess 134 may have an inclined shape such that the second locking recess 134 is recessed to a gradually increasing depth along a direction from the first short direction lower surface edge portion 142 to the second short direction lower surface edge portion 144.

Such first and second locking recesses 133, 134 may have a symmetric shape with each other by 180 degrees with reference to the center of the lower surface 112. This is to allow use of the second major cutting edge 124, the second minor cutting edge 125 and the second inclined cutting edge 126, when wears or breakages occur in the first major cutting edge 121, the first minor cutting edge 122 and the first inclined cutting edge 123 by rotating these by 180 degrees.

Furthermore, referring back to FIG. 5, the first locking recess 133 may be exposed to the second inclined side surface 113$f$, and referring back to FIG. 4, the second locking recess 134 may be exposed to the first inclined side surface 113$c$. That is, such exposure structure can allow maximized inclined area of the first and second locking recesses 133, 134, which can further prevent escaping of the insert 100 from the tool holder 200. Meanwhile, in another example, although not illustrated, it may be implemented such that the first locking recess 133 may be exposed to the first inclined side surface 113$c$, and the second locking recess 134 may be exposed to the second inclined side surface 113$f$.

To described the specific design specifications in further detail, the first and second locking recesses 133, 134 may be designed to satisfy the mathematical expressions 0.5H>h and 0<α<5°, where "H" denotes the height of the insert body 110, "h" is the depth of each of the first and second locking recesses 133, 134, and "α" is a tilt angle of the first and second locking recesses 133, 134. Specifically, tests have confirmed that, when h is equal to or greater than 0.5H, and α is greater than 5°, the strength of the insert 100 would deteriorate, thus causing breakage of the insert 100 during high-speed process, but when "h" is less than 0.5H and "α" is from 0 to 5°, the breakage rate of the insert 100 during high-speed process can be maintained almost the same as in the related technology where there is no first and second locking recesses 133, 134, while escaping of the insert 100 from the tool holder 200 was also prevented.

Hereinbelow, the first and second major side surfaces 113$a$, 113$d$ having the major edge clearance surface E will be described in detail with reference to FIG. 6.

Figure 6:
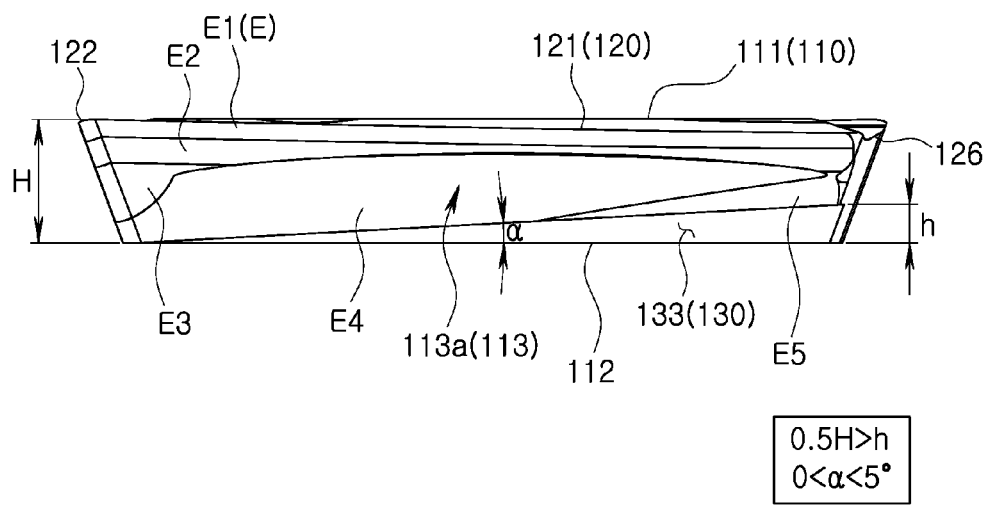
FIG. 6 is a view illustrating a major edge clearance surface forming a major side surface of the insert of FIG. 2.

FIG. 6 is a view illustrating a major edge clearance surface forming a major side surface of the insert of FIG. 2.

As illustrated in FIG. 6, the second major side surface 113$d$ has the 180-degree symmetric shape with the first major side surface 113$a$ with reference to the upper surface 111 of the insert body 110. Accordingly, only the first major side surface 113$a$ will be mainly described below for the sake of brevity.

The first major side surface 113$a$ may form the major edge clearance surface E. More specifically, the major edge clearance surface E formed on the first major side surface 113$a$ may include first, second, third, fourth, and fifth clearance surfaces E1, E2, E3, E4, E5, as illustrated in FIG. 6.

The first clearance surface E1 is the clearance surface in contact with the first major cutting edge 121. The second clearance surface E2 is the clearance surface extending from the first clearance surface E1, and having a greater clearance angle than the first clearance surface E1. The third clearance surface E3 is the clearance surface extending from the clearance surface adjacent to the side of the first minor side surface 113$b$ in the second clearance surface E2, being curved convexly toward the first long direction lower surface edge portion 141, and having a greater clearance angle than the second clearance surface E2. The fourth clearance surface E4 is the clearance surface having a portion extending from the second clearance surface E2, the rest portion extending from the third clearance surface E3, and being curved convexly toward the first major cutting edge 121. Additionally, the fifth clearance surface E5 is the clearance surface extending from a clearance surface adjacent to the side of the second inclined side surface 113$f$ in the fourth clearance surface E4, being inclined toward the center of the lower surface 112, and having a clearance angle same as that of the third clearance surface E3. Accordingly, since the first, second, third, fourth, and fifth clearance surfaces E1, E2, E3, E4, E5 have corresponding clearance angles and step-wise shapes with each other (i.e., uneven shape), escaping of the insert 100 due to centrifugal force or centripetal force can be prevented.

In addition, the insert 100 according to an exemplary embodiment may additionally include a center hole 150, as illustrated in FIGS. 2 to 5.

The center hole 150 is formed at a center of the upper surface 111 of the insert body 110, by being passed through the insert body 110 from the upper surface 111 to the lower surface 112. Accordingly, because one pin (not illustrated) is inserted in one center hole 150 for coating during a coating process to coat the insert 100, compared to the related example in which the pins are inserted into the respective first and second fastening holes 131, 132, lot deviation of the thin films occurring during mass production can be minimized, and the charge per coating can be increased.

Further, the center hole 150 may be formed at a center between the first and second fastening holes 131, 132. By doing so, the 180-degree rotational symmetry can also be maintained with the first and second fastening holes 131, 132 with reference to the center hole 150.

Hereinbelow, the tool holder 200 according to an exemplary embodiment will be described with reference to FIGS. 1 and 7.

Figure 7:
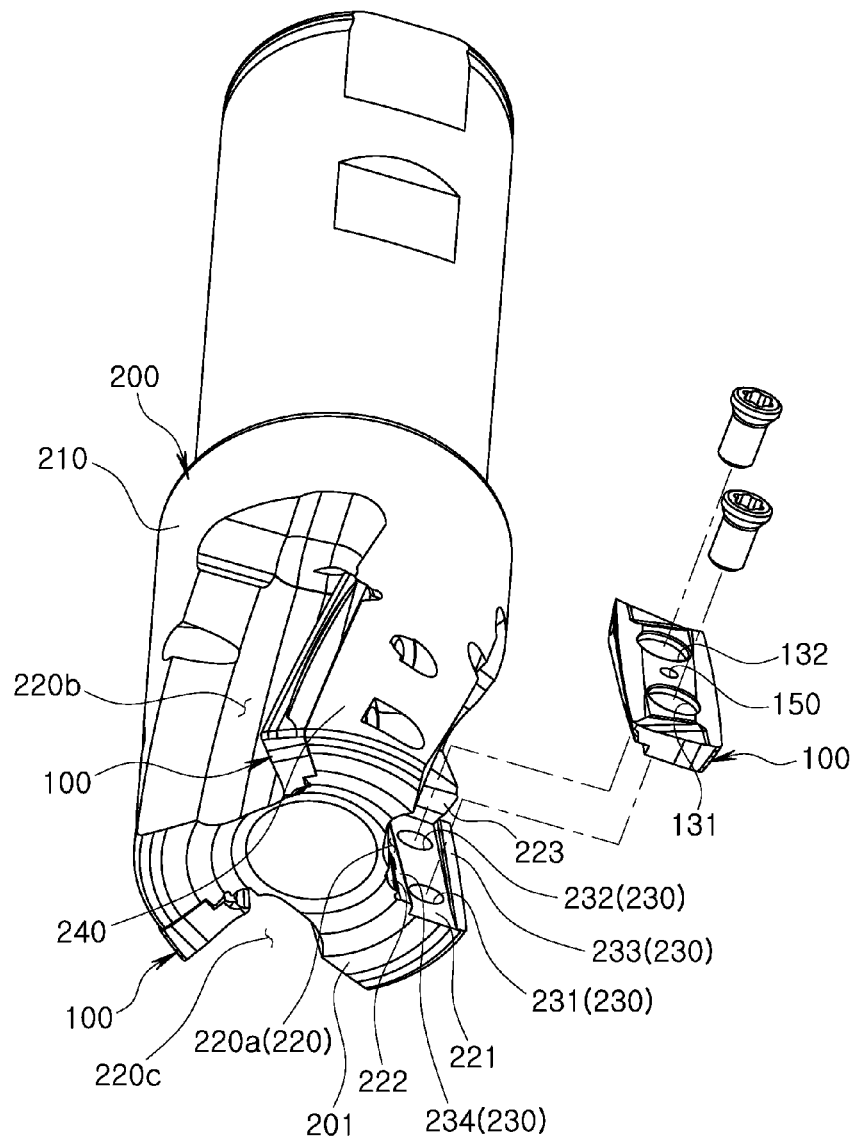
FIG. 7 is an exploded perspective view of the insert-tool holder assembly of FIG. 1.
Figure 8:
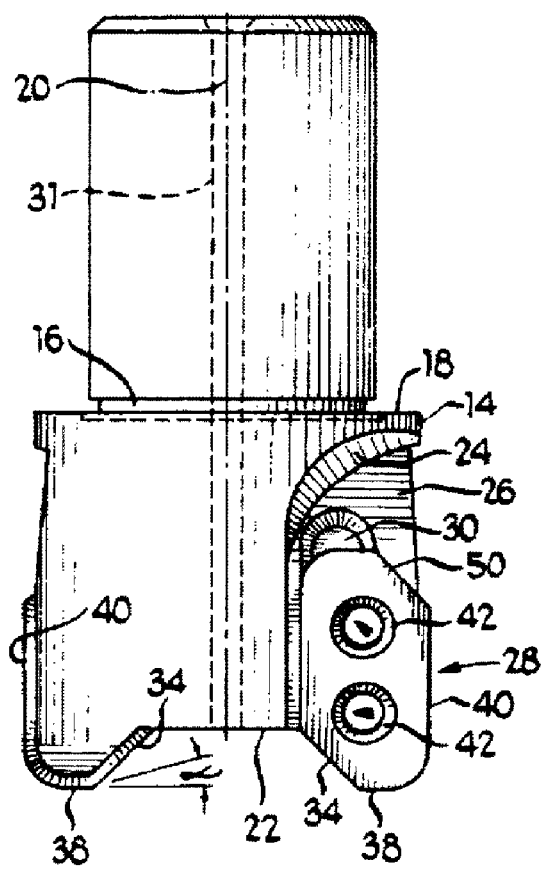
FIG. 8 is a front view showing a related insert router.
Figure 9:
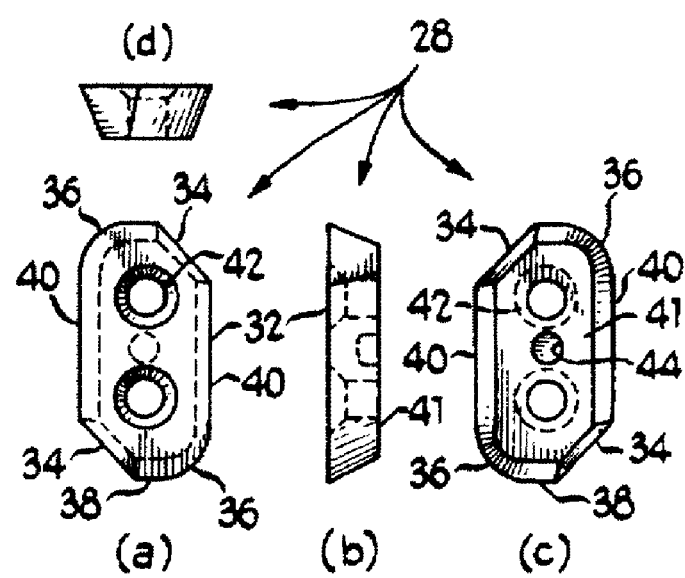

FIG. 7 is an exploded perspective view of the insert-tool holder assembly of FIG. 1.

As illustrated in FIGS. 1 and 7, the tool holder 200 according to an exemplary embodiment includes a holder body 210, two or more chip pockets 220, and an insert fastening portion 230.

The holder body 210 forms the body of the tool holder 200, and as illustrated in FIGS. 1 and 7, takes a form of approximately cylindrical pillar. The holder body 210 has two or more chip pockets 220 along the circumference thereof.

Each of the two or more chip pockets 220 is provided with a lower surface sheet portion 221, a major side surface sheet portion 222, and an inclined side surface sheet portion 223, as illustrated in FIGS. 1 and 7. Specifically, the two or more chip pockets 220 may include first, second, and third chip pockets 220a, 220b, 220c formed at intervals along the circumference of the tool holder 200, in which webs 240 are automatically formed between the first and second chip pockets 220a, 220b, between the second and third chip pockets 220b, 220c, and between the third and first chip pockets 220c, 220a, respectively.

Further, each of the two or more chip pockets 220 may have a helical shape. Further, the web 240 therebetween may also have a helical shape. Accordingly, since the web 240 may have the helical shape and maintain almost a constant width along the helical shape, the rigidity of the tool holder 200 can be maintained constantly along the leading end 201 of the tool holder 200 to the tail end.

As illustrated in FIG. 7, the insert fastening portion 230 is provided at the insert body 210 to fasten the insert 100, and includes one or more screw holes (see 231, 232), and one or more locking protrusions (see 233, 234).

The one or more screw holes (see 231, 232) may be formed at a long direction center of the lower surface sheet portion 221. More specifically, as illustrated in FIG. 7, the one or more screw holes (see 231, 232) may include first and second screw holes 231, 232 formed sequentially along the long direction of the lower surface sheet portion 221.

As illustrated in FIG. 7, the one or more locking protrusions (see 233, 234) may include first and second locking protrusions 233, 234, and as illustrated in FIG. 7, the first and second locking protrusions 233, 234 may be protruded on a periphery of the lower surface sheet portion 221. For example, as illustrated in FIG. 7, the first and second locking protrusions 233, 234 may each be protruded from the first and third sheet edge portions (not illustrated) (e.g., two long opposed edges of the lower surface sheet portion 221), or although not illustrated, may each be protruded from the third and fourth sheet edge portions (not illustrated) (e.g., two short opposed edges of the lower surface sheet portion 221). Accordingly, the first and second locking protrusions 233, 234 of the tool holder 200 can prevent escaping of the insert 100 from the tool holder 200.

Specifically, as illustrated in FIG. 7, the first locking protrusion 233 may be in contact with the outer circumference of the tool holder 200 and have an inclined shape such that it protrudes to a gradually increasing height in a direction to the inclined side surface sheet portion 223, and the second locking protrusion 234 may be in contact with the major side surface sheet portion 222 and have an inclined shape such that it protrudes to a gradually increasing height along a direction to the leading end 201 of the tool holder 200. Accordingly, since such inclined shapes enable to achieve the shapes corresponding to the first locking recesses 133, 134 of the insert 100 described above, large helix angle with the first and second locking recesses 133, 134 can be configured, and thus, the process load of high depth process can be reduced. Furthermore, since the inclined shape of the first and second locking protrusions 233, 234 described above allows a fastening area for the first and second locking recesses 133, 134 to be increased as the cutting depth increases in the lengthwise direction, the fastening torque can be maintained stably with respect to the process load during high depth process. Further, the first and second locking protrusions 233, 234 causes build-up to be formed on the lower surface sheet portion 221 of the holder body 210 such that escaping of the insert 100 by the centrifugal force due to high-speed process can be prevented.

Such first and second locking protrusions 233, 234 may have a symmetric shape with each other by 180 degrees with reference to the center of the lower surface sheet portion 221. This is to allow use of the second major cutting edge 124, the second minor cutting edge 125 and the second inclined cutting edge 126, when wears or breakage occur in the first major cutting edge 121, the first minor cutting edge 122 and the first inclined cutting edge 123 of the insert 100 by rotating these by 180 degrees.

Hereinbelow, the assembly of the insert and the tool holder according to an exemplary embodiment will be described with reference to FIGS. 1 and 7.

The assembly of the insert and the tool holder according to an exemplary embodiment includes the insert 100 and the tool holder 200, as illustrated in FIGS. 1 and 7. In describing the exemplary embodiment, the configuration for fastening the insert 100 and the tool holder 200 will be mainly described, while the insert 100 and the tool holder 200 are described as brief as possible as these are already described in detail above.

As illustrated in FIG. 7, the holder fastening portion 130 of the insert 100 includes first and second fastening holes 131, 132 formed through the center portion of the insert body 110 from the upper surface 111 to the lower surface 112. The first and second fastening holes 131, 132 are formed at a distance apart from each other, sequentially in a direction farther away from the leading end 201 of the tool holder 200. As illustrated in FIG. 7, the insert fastening portion 230 of the tool holder 200 includes first and second screw holes 231, 232 each corresponding to the first and second fastening holes 131, 132. Further, the first fastening hole 131 and the first screw hole 231 are fastened with a first bolt and the second fastening hole 132 and the second screw hole 232 are fastened with a second bolt.

Further, as illustrated in FIG. 7, the holder fastening portion 130 of the insert 100 includes first and second locking recesses 133, 134 each formed by being recessed into the first and second long direction lower surface edge portions 141, 143 of the lower surface 112 of the insert body 110, and the insert fastening portion 230 of the tool holder 200 includes first and second locking protrusions 233, 234 each being locked in the first and second locking recesses 133, 134. Accordingly, since the first locking recess 133 is locked with the first locking protrusion 233, and the second locking recess 234 is locked with the second locking protrusion 234, escaping of the insert 100 from the tool holder 200 can be prevented.

As described above, the insert, the tool holder, and the assembly thereof according to an exemplary embodiment can provide the following effects.

According to an exemplary embodiment, since one or more locking recesses (see 133, 134) are formed in the lower surface 112 of the insert body 110, escaping of the insert 100 from the tool holder 200 can be prevented. Specifically, when the first and second locking recesses 133, 134 are each formed in the first and second long direction lower surface edge portions 141, 143 of the lower surface 112 of the insert body 110, the first and second locking recesses 133, 134 have an inclined shape such that it is recessed to a gradually increasing depth along a direction to the first or second short direction lower surface edge portion 142 or 144. Accordingly, the helix angle can be configured as large as the tilt angle of the inclination such that the process load can be reduced during high depth process. Furthermore, since the inclined shape of the first and second locking recesses 133, 134 described above allows a fastening area to be increased as the cutting depth increases in the lengthwise direction, the fastening torque can be maintained stably with respect to the process load during high depth process. Further, since the first and second locking protrusions 233, 234 are formed on the holder body 210 to be locked in the first and second locking recesses 133, 134 in inclined shape, build-up is formed on the lower surface sheet portion 221, thus preventing escaping of the insert 100 by the centrifugal force generated during high-speed process.

Further, according to an exemplary embodiment, the center hole 150 is additionally formed in the center of the upper surface 111 of the insert body 110, by being passed through the insert body 110 from the upper surface 111 to the lower surface 112. Accordingly, since one pin (not illustrated) can be inserted in one center hole 150 for coating in the coating process to coat the insert 100, compared to a related example in which the pins are inserted into each of the first and second fastening holes, the lot deviations of the thin film can be minimized, and charge per coating can be increased.

Further, according to an exemplary embodiment, since the major edge clearance surface E of the insert 100 includes first, second, third, fourth, and fifth clearance surfaces E1, E2, E3, E4, E5 each having a corresponding clearance angle, and thus has an uneven stepped shape, escaping of the insert 100 due to centrifugal force or centripetal force can be prevented.

While exemplary embodiments are described in detail above, the scope of the present disclosure is not limited herein, but various changes and modified forms using the basic concept of the present disclosure as defined in the following claims also fall under the scope of the present disclosure.

INDUSTRIAL APPLICABILITY

The present disclosure relates to an insert, tool holder, and an assembly thereof, and therefore, has the industrial applicability as it is applicable to cutting a workpiece.

What is claimed is:

1. An insert comprising an insert body, and a holder fastening portion provided in the insert body to be fastened to a tool holder,
   wherein the holder fastening portion comprises
   one or more fastening holes formed by being passed through the insert body from an upper surface to a lower surface, and
   one or more locking recesses formed by being recessed into a lower surface periphery of the insert body,
   wherein the lower surface periphery comprises first, second, third, and fourth lower surface edge portions sequentially along a circumference thereof,
   the one or more locking recesses comprise first and second locking recesses, and
   the first and second locking recesses are each formed by being recessed in the first and third lower surface edge portions,
   wherein the first locking recess has an inclined shape such that the first locking recess is recessed to a gradually increasing depth along a direction from the second lower surface edge portion to the fourth lower surface edge portion, and
   the second locking recess has an inclined shape such that the second locking recess is recessed to a gradually increasing depth along a direction from the fourth lower surface edge portion to the second lower surface edge portion.

2. The insert of claim 1, wherein the first and second locking recesses have a symmetrical shape with each other by 180 degrees with reference to a center of the lower surface.

3. The insert of claim 1, wherein a first major cutting edge, a first minor cutting edge, a first inclined cutting edge, a second major cutting edge, a second minor cutting edge, and a second inclined cutting edge are formed sequentially on an upper surface of the insert body along a circumference thereof,
   a side surface of the insert body comprises, sequentially along a circumference thereof, a first major side surface connected to the first major cutting edge, a first minor side surface connected to the first minor cutting edge, a first inclined side surface connected to the first inclined cutting edge, a second major side surface connected to the second major cutting edge, a second minor side surface connected to the second minor cutting edge, and a second inclined side surface connected to the second inclined cutting edge,
   the first locking recess is exposed to one of the first and second inclined side surfaces, and
   the second locking recess is exposed to the other of the first and second inclined side surfaces.

4. The insert of claim 1, wherein, when a height of the insert body is "H", a depth of each of the first and second locking recesses is "h", and a tilt angle of the first and second locking recesses is "α",
   0.5H>h, and
   0<α<5°.

5. The insert of claim 3, wherein the first major side surface forms a major edge clearance surface, and
   the major edge clearance surface comprises
   a first clearance surface in contact with the first major cutting edge,
   a second clearance surface extending from the first clearance surface and having a greater clearance angle than the first clearance surface,
   a third clearance surface extending from a clearance surface adjacent to a side of the first minor side surface in the second clearance surface, being curved convexly toward the lower surface, and having a greater clearance angle than the second clearance surface,
   a fourth clearance surface having a portion extending from the second clearance surface, and a rest portion extending from the third clearance surface, and being curved convexly toward the first major cutting edge, and a fifth clearance surface extending from a clearance surface adjacent to a side of the second inclined side surface in the fourth clearance surface, being inclined toward a center of the lower surface, and having a clearance angle same as the second clearance surface.

6. The insert of claim 1, further comprising a center hole formed in a center of an upper surface of the insert body, passing through the insert body from the upper surface to a lower surface thereof.

7. The insert of claim 6, wherein the one or more fastening holes comprise first and second fastening holes formed sequentially in the insert body, and the center hole is formed at a center between the first and second fastening holes.

8. A tool holder comprising a holder body having a lower surface sheet portion, a major side surface sheet portion, and an inclined side surface sheet portion, and an insert fastening portion provided in the holder body to fasten the holder fastening portion of an insert, wherein the insert fastening portion comprises one or more screw holes formed at a center portion of the lower surface sheet portion, and one or more locking protrusions protruding from a periphery of the lower surface sheet portion, wherein the one or more locking protrusions comprise first and second locking protrusions, the periphery of the lower surface sheet portion comprises first, second, third, and fourth sheet edge portions sequentially along a circumference thereof, and the first and second locking protrusions are each protruded from the first and third sheet edge portions.

9. The tool holder of claim 8, wherein the first locking protrusion is in contact with an outer circumference of the tool holder, and has an inclined shape such that the first locking protrusion protrudes to a gradually increasing height along a direction toward the inclined side surface sheet portion, and the second locking protrusion is in contact with the major side surface sheet portion, and has an inclined shape such that the second locking protrusion protrudes to a gradually increasing height along a direction toward a leading end of the tool holder.

10. The tool holder of claim 8, wherein the one or more screw holes comprise first and second screw holes formed sequentially at a center portion of the lower surface sheet portion.

* * * * *